United States Patent [19]

Lane et al.

[11] Patent Number: 4,921,004
[45] Date of Patent: May 1, 1990

[54] PIERCING SURGE REGULATOR VALVE AND APPARATUS

[75] Inventors: Joseph A. Lane, Taunton, Mass.; Robert H. Jernberg, East Hampton, Conn.

[73] Assignee: Amtrol Inc., West Warwick, R.I.

[21] Appl. No.: 394,113

[22] Filed: Aug. 15, 1989

[51] Int. Cl.⁵ .................. F16K 43/00; F16L 55/04
[52] U.S. Cl. ................. 137/318; 137/207; 138/30
[58] Field of Search .......... 137/207, 318, 593; 138/26, 30, 31; 222/3, 81, 83, 83.5, 91; 285/197, 198, 199

[56] References Cited

U.S. PATENT DOCUMENTS

| | | | |
|---|---|---|---|
| 2,130,333 | 9/1938 | Allen | 137/318 |
| 2,310,083 | 2/1943 | Holmes et al. | 72/325 |
| 2,378,517 | 6/1945 | Trautman | 138/30 |
| 2,474,512 | 6/1949 | Bechtold et al. | 138/30 |
| 2,740,259 | 4/1956 | Westlund | 138/30 |
| 2,757,689 | 8/1956 | Knox | 138/30 |
| 3,045,512 | 7/1962 | Risley et al. | 137/318 |
| 3,082,793 | 3/1963 | Sugimura | 138/30 |
| 3,115,889 | 12/1963 | Franck et al. | 137/318 |
| 3,131,712 | 5/1964 | Risley et al. | 137/318 |
| 3,148,696 | 9/1964 | Hoke | 137/318 |
| 3,162,211 | 12/1964 | Barusch | 137/318 |
| 3,198,206 | 8/1965 | O'Brien | 137/318 |
| 3,222,027 | 12/1965 | Gilleeny | 251/214 |
| 3,240,226 | 3/1966 | Burkholder | 137/318 |
| 3,252,474 | 5/1966 | Ehrens et al. | 137/318 |
| 3,252,475 | 5/1966 | Jones | 137/318 |
| 3,394,727 | 7/1968 | Wagner | 137/318 |
| 3,422,853 | 1/1969 | Schmid | 138/30 |
| 3,428,075 | 2/1969 | Wagner, II | 137/318 |
| 3,495,615 | 2/1970 | Ehrens | 137/318 |
| 3,554,217 | 1/1971 | Ehrens | 137/318 |
| 3,580,269 | 5/1971 | Ehrens | 137/318 |
| 3,628,573 | 7/1970 | Loliger et al. | 138/30 |
| 3,690,347 | 9/1972 | Zahid | 138/30 |
| 3,695,298 | 10/1972 | Zahid | 138/30 |
| 3,714,959 | 2/1973 | Pignataro, Jr. | 137/318 |
| 3,930,521 | 1/1976 | Zahid | 138/31 |
| 3,973,584 | 2/1975 | McKinnon et al. | 137/318 |
| 3,978,881 | 9/1976 | Mouraine | 137/318 |
| 4,018,246 | 4/1977 | Langstroth | 137/318 |
| 4,034,777 | 7/1977 | Gebelius | 137/318 |
| 4,204,559 | 5/1980 | Wagner | 137/318 |
| 4,240,459 | 12/1980 | Trautwein | 137/318 |
| 4,364,046 | 12/1982 | Bohlin | 137/318 |
| 4,537,214 | 8/1985 | Cowan | 137/318 |
| 4,540,011 | 9/1985 | Croxford et al. | 137/318 |
| 4,611,624 | 9/1986 | Snyder | 137/318 |
| 4,776,362 | 10/1988 | Domingue, Sr. et al. | 137/318 |

FOREIGN PATENT DOCUMENTS

| | | | |
|---|---|---|---|
| 921735 | 2/1973 | Canada | 137/318 |
| 2378966 | 9/1978 | France | 137/593 |
| 1498263 | 1/1978 | United Kingdom | 137/318 |

Primary Examiner—George L. Walton
Attorney, Agent, or Firm—Fisher, Christen & Sabol

[57] ABSTRACT

Piercing surge regulator valve for use with a liquid-carrying member. There is a valve body adapted to be connected to the fluid-carrying member in a sealing manner. The valve body comprises a housing and a housing fitting inside of the housing, the housing and housing fitting being movable in relation to each other. There is a bore in the valve body. There is also a container containing a flexible diaphragm therein so as to divide the container into two chambers, one chamber adapted to contain pressurized gas and the other chamber adapted to contain pressurized liquid, the container having a hole whereby the pressurized-liquid chamber communicates with the bore. A piercing element is present in the bore and has a passage therethrough. The housing fitting engages the piercing element, movement of the housing fitting inwardly in relation to the housing causing the piercing element to move in the direction toward the liquid-carrying member. The piercing element is capable of piercing a hole in the liquid-carrying member. Once the piercing surge regulator valve is emplaced on the pipe, water hammer in the pipe can be controlled.

3 Claims, 3 Drawing Sheets

PIERCING SURGE REGULATOR VALVE AND APPARATUS

BACKGROUND OF THE INVENTION

1. Field Of The Invention

The invention relates to surge regulator valves having an integral tap for piercing an otherwise sealed pipe for the control of water-hammer in pipes.

2. Background Art

U.S. Pat. No. 3,198,206 discloses a piercing valve for recharging a hermetically sealed unit. The valve includes body means attachable to a line of the unit, sealing means between the body and the line, a bore extending through said body, and an external threaded area on the body coaxial with the bore. There is passage means in the body intersecting the bore and piercing means positionable in the bore and having sealing means thereon for controlling communication between the line and the passage means. There is a thrust cap threadedly connected to the threaded area of the body and having locking slot means thereon. The slot means has portions of different diameter. There is means integral with the piercing means including a groove and head means of unequal diameter at opposite ends of the groove enabling assembly of the piercing means in the thrust cap locking slot means in one aligned position and precluding disassembly of the thrust cap and the piercing means in another aligned position in which other position the cap is laterally displaced with respect to the axis of the piercing means. The thrust cap can be threadedly mounted on the body.

U.S. Pat. No. 3,240,226 discloses a self-tapping service valve fitting for plastic mains. It includes a service fitting having a tube having a counterbored through bore and a lateral outlet in the inner, larger bore of the through bore. The fitting has an outlet tube extending from the lateral outlet and an arcuate saddles through which the inner, larger bore of the through bore extends from the through bore tube. The arcuate saddle is complementary to a plastic main to which it is to be secured, an arcuate saddle clamp. There is means for securing the saddle clamp to the through bore saddle to embrace the plastic main therebetween and secure the fitting to the plastic main, an O-ring receiving groove in the main contacting surface of the through bore saddle about the through bore therethrough and an O-ring in the groove providing an effective seal between the fitting and the plastic main about the through bore. The through bore has an interior thread extending inwardly of the outer, smaller bore thereof. There is a complementary threaded plug in the threaded outer, smaller bore of the through bore. There is a circular cutting knife coaxially secured to the inner end of the plug for projecting out of the inlet end of the bore at its inner end for cutting a hole in the main, concentric with the bore, by screwing the plug theretoward. The circular knife has a cylindrical interior surface extending inwardly from its circular cutting edge for receiving and trapping the coupon cut from the main therewithin. The interior cylindrical surface of the circular knife is counterbored. The larger bore thereof is more remote from the circular cutting edge. The outer surface of the cutting knife is beveled toward its cutting edge. The cutting edge is a projection of the interior cylindrical surface. The through bore tube also has an exterior thread extending from its outer end, a complementary threaded cap screwed thereover. The cap has an O-ring receiving groove in its tube end annulus engaging surface, and an O-ring in the cap groove providing an effective seal between the cap and the tube end annulus. The means for securing the through bore saddle and the saddle clamp comprising lips extending laterally from adjacent edges of the through bore saddle laterally from adjacent edges of the through bore saddle and the saddle clamp. The lips have aligned apertures. There is bolt means secured through the aligned apertures.

U.S. Pat. No. 3,428,075 discloses a spring retractable line piercing valve which includes an upper housing and a lower housing. The lower housing is fastenable to said upper housing to define a transverse bore therebetween. There is a valve enclosure which is located on the upper housing and has an open top with a ring gasket disposed circumferentially of the opening. A piercing valve is disposed within the valve enclosure and above the bore, and is depressable into the bore. There is a spring which urges the piercing valve away from the bore into sealing contact with the ring gasket. A sealing cap is threadedly engageable with the valve enclosure. There is a removable depressor pin which is removably threaded to the sealing cap in co-axial alignment with the piercing valve for bearing against and depressing the piercing valve axially toward the bore to pierce a line tube therein upon threaded advancement of the sealing cap. The removable depressor pin is in sealing engagement with the ring gasket. There is selective flow communication with the tapped line through the valve enclosure.

U.S. Pat. No. 3,628,753 discloses a diaphragm chamberdamping device having a dished shell below the diaphragm which cooperates with a separating wall to form a pair of chambers within the liquid compartment while providing for a flow of fluid between the two chambers. One chamber communicates with an inlet pipe while the other chamber communicates with an outlet pipe so that fluid can be passed through the device.

U.S. Pat. No. 3,973,584 discloses a valve which has upper and lower block portions that are adapted to receive corresponding portions of any desired short straight length of the pipeline. A screw tap bearing a piercing needle is provided to initially tap the pipeline. The hole created thereby is allowed to freely communicate with a port access inlet passage provided in the top block portion when the screw is backed off. A first seal is provided around the pierced hole at the pipeline/top block interface. A second seal is provided between the screw tap and the top block interface at the point that the screw tap is externally accessible. A third seal is provided by way of and within an external screw-on cap covering the port access inlet passageway when not otherwise being used. Thus, the valve can be essentially permanently attached to the pipeline, ensuring proper initial registration of the tap and pipeline and subsequent capping of the tapped hole to ensure the most minimal gas leakage from the system.

U.S. Pat. No. 3,978,881 discloses a valve assembly for use on a refrigerating pipe line to gain access to the refrigerant so that it can be removed or replaced without disassembly of the piping while repairs are being made. The assembly is a compact structure comprising a single integral body member having a stem within which is a movable pierce valve and having a transverse threaded nipple forming an internal fluid passageway controlled by the adjustment of the movable pierce valve. The valve is in non-removable position within said body and is sealed to the body by an O-ring placed in an undercut on the stem of the valve. Interchangeable clamp plates secure the pipe line to the body adjacent the point of the pierce valve. Each of two interchangeable plates has two sets of grooves so that four sizes of tubes can be accommodated by interchanging and adjusting the two clamp plates.

U.S. Pat. No. 4,018,246 discloses a line tap valve having a body portion integrally formed with opposed leg portions defining a saddle for the reception of a line to be tapped and bendable into embracing relation about the line to retain it securely in place during soldering or brazing. The line tap valve further includes piercing needle mechanism separable from the body portion during the soldering or brazing operation, but adapted to be permanently assembled thereto after such soldering or brazing by a body screw-on cap and associated flare mechanism operative to simultaneously pierce the line and swage a retaining ring for securing the piercing needle mechanism in place.

U.S. Pat. No. 4,204,559 discloses a line tap valve for tapping refrigerant lines of refrigeration and air conditioning systems. The line tap valve has a housing which is adapted to be clamped to a refrigeration line. The housing has two non-aligned, communicating valve bodies or chambers, a line piercing valve in one valve body or chamber and a service valve in the other valve body or chamber. The line piercing valve and the service valve are independently operable, to control the flow into and out of the refrigerant line. The service valve is removable and replaceable without refrigerant leakage when the line piercing valve is in the closed position. The line piercing valve is retractable from the refrigerant line to provide an unimpeded flow therethrough when the service valve is in the closed condition.

U.S. Pat. No. 4,240,459 discloses a valve assembly adapted to be emplaced upon a pipe comprises a housing having a bore extending perpendicular to the pipe to which the valve is to be connected and serving as a guide passage for a drill adapted to penetrate the pipe wall. The housing is formed with a transverse slot through which a slider can be inserted to block escape of fluid from the passage upon withdrawal of the drill. The control member is then mounted in this passage and can be used to open and close the valve which communicates with the pipe to which the valve connects via the aforementioned slot.

U.S. Pat. No. 4,537,214 discloses a piercing valve comprises upper and lower blocks having, respectively, lower and upper mating surfaces. Each mating surface has a positionally corresponding generally linear groove extending thereacross. The upper block has a cylindrical bore extending vertically therethrough and intersecting the grooved lower surface thereof. An upper bore section is adapted for receiving screw threads, with the topmost section of the bore having a diameter less than that of the threaded upper section thereof. The lower section of the bore is of a diameter larger than that of the upper section. The upper block further has an access port extending therethrough and intersecting the bore along the lower section thereof, a cylindrical piercing needle, and a cylindrical unitary seal. The piercing needle has an upper threaded portion having a radial diameter suitable for engaging the threads of the bore, a coaxial central portion having a decreasing radial diameter, and a coaxial lower portion having means for tapping an access hole. A cylindrical seal having a gas or liquid communication therethrough so as to permit the communication of the gas or liquid from a point external to the mated upper and lower portions of the block into the region defined by the grooves thereof is coaxially interposed between the valve and the inner bore surface of the upper fixtures. The seal further extends above the intersection point of the access port with the bore and is of a length to make sealing contact with the surface of the pipeline being pierced.

U.S. Pat. No. 4,540,011 discloses a device for forming a branch connection in a pipe. The device includes a saddle member having a fluid passage in it and arranged to be secured to the surface of the pipe arranged to be secured to the surface of the pipe with an end of the passage closed by the pipe surface when the saddle member is placed thereon. The saddle member has a groove therein for longitudinal reception of a portion of the length of the pipe. There is sealing means for forming a fluid-tight seal between the surface of the pipe and the adjacent surface of the saddle member around the end of the passage. There is a backing member having a groove therein for longitudinal reception of a portion of the length of the pipe. The groove in the backing member opposes the groove in the saddle member with the portion of the pipe received in the grooves. There is means to urge the saddle member and backing member toward one another with the portion of the pipe received in the opposed grooves. There is a cutting element carried by one of the members and capable of rotation relative to such member about an axis transverse to the pipe axis. The cutting element has a cutting edge offset from the axis of rotation. The cutting element is further capable of simultaneous movement toward the axis of the pipe causing the cutting edge to progressively cut through the wall of the pipe in a circular path. The member includes means to depress a portion of the pipe in the path once its saddle member and backing member are urged together so that as the cutting edge progressively cuts around the path it will cut from a beginning at one point on the path to an end at another point on the path spaced from the first point, with a relatively small part of the wall uncut to form a partcircular tongue joined to the remainder of the pipe wall by a narrow web between the points. The cutting element is capable, on further movement toward the pipe axis, of depressing the tongue inwardly while leaving it attached to the remainder of the pipe by the narrow web.

U.S. Pat. No. 4,611,624 discloses a line piercing valve assembly having a transverse cylindrical bore for the reception of a length of tubing to be pierced and an interior recess open to the outside disposed within which is a piercing needle and valve member depressable into the bore for flow communication with the pierced or tapped line. The piercing needle and valve member normally are spring urged away from the length of tubing into sealing contact with a valve seat. A depressor pin is removably attached to the upper end of the piercing needle and valve member for depressing it sufficiently to pierce the tubing upon screw-threading advancement of an internally-threaded cap enclosing the open end of the interior recess. The interior bottom wall of the cap abuttingly engages the outer end of the pin for this purpose. An "O" ring seated within an annular recess concentric with and open into the cylindrical bore seals against leakage of the tubing pierced.

U.S. Pat. No. 4,776,362 discloses a pressure relief valve having an external substantially-cylindrical valve body, with a bore therethrough positioned, atop the exterior of the pipe. An internal stem portion, which is movable within the bore within the valve body, includes a tip for extruding in through a bore in the wall of the pipe. A piston member housed within the internal movable valve body is movable from a first position locking fluid flow up through the internal body and a second position allowing fluid to enter the internal body and enter a drain port. There is a spring member intermediate the upper portion of the valve head and the internal body for biasing the piston member in a normally closed fluid blocking position. There is also insulation means for housing the external valve and for insulating the valve from direct contact with the fluid flow line.

French Published Patent Application No. 2,378,966 discloses a hydraulic accumulator having a cylindrical body which contains an inflatable bladder. The bladder is inflated with high pressure nitrogen through the charging valve in order to maintain a continuous pressure on the oil in the space outside the bladder. In order to prevent the bladder being forced into the oil outlet pipe when all the oil has been forced out of the accumulator, the pipe is fitted with a valve consisting of a cylindrical plug with transverse holes and normally kept in the open position by a spring. When the lower surface of the bladder reaches the end wall of the accumulator, the plug is pushed downwards so that its dome end is flush with the accumulator internal surface.

Canadian Patent No. 921,735 discloses a tap valve for use with a fluid carrying member. There is a valve body adapted to be connected to the fluid carrying member, a bore in the valve body, a fluid passageway communicating with the bore, and a piercing element movable in the bore and having a passage therethrough. There is an axially movable valve stem in the bore movable in a first direction to engage and cause the piercing element to move in the first direction to pierce said fluid carrying member and in a second direction away from the piercing element. The valve stem is provided with a piercing element engaging surface for sealing the piercing element passage when the valve stem engages the piercing element to prevent fluid flow therethrough. The piercing element can include a tubular member having a circular wall and a pointed end, a first angulated edge connecting the pointed end with a first portion of the circular wall, a second angulated edge extending rearwardly from the pointed end, and a third angulated edge connecting the second angulated edge with a second portion of the circular wall. The first and second angulated edges subtend substantially equal arcs with respect to a line parallel to the axis of the tubular member and passing through the pointed end.

BROAD DESCRIPTION OF THE INVENTION

An object of the invention is to provide a piercing surge regulator valve for emplacement on an existing pipe or tube. Other objects and advantages of the invention are set out herein or are obvious herefrom to one skilled in the art.

The invention involves a piercing surge regulator valve for use with a liquid-carrying member, such as, a pipe or tube. The invention surge regulator valve includes a valve body adapted to be connected to the fluid-carrying member in a sealing manner. The valve body comprises a housing and a housing fitting inside of the housing, the housing and housing fitting being movable in relation to each other. There is a bore in the valve body. There is also a container containing a flexible diaphragm therein so as to divide the container into two chambers, one chamber adapted to contain pressurized gas and the other chamber adapted to contain pressurized liquid, the container having a hole whereby the pressurizedliquid chamber communicates with the bore. A piercing element is present in the bore and has a passage therethrough. The housing fitting engages the piercing element, movement of the housing fitting inwardly in relation to the housing causing the piercing element to move in the direction toward the liquid-carrying member. The piercing element is capable of piercing a hole in the liquid-carrying member. The invention device is direct acting, that is, it provides the piercing bore by moving the housing filling inward relative to the housing. Once the piercing surge regulator valve is emplaced on the liquid-carrying member, water hammer in the pipe can be controlled so as to minimize it and its effects.

The piercing surge regulator valve can be placed on an existing pipe, conduit, pipeline or the like, even while there is liquid under pressure in the pipe, etc. It is not necessary to cut the pipe and install a tee-joint therein in order to emplace the invention surge regulator valve. Piping does not have to be spliced or changed, and does not have to be drained in order to install the invention device. There is no need to use a professional plumber to install the invention device. The piercing surge regulator valve is installed on the top of the pipe in an alignment which is above the horizontal, most preferably on the vertical, so as to help avoid possible contamination of the water in the pipe.

The invention device can be emplaced on many types of pipe, preferably thin-walled or lightweight copper tubing (as used for water lines) or plastic pipe.

Usually the surge regulator container is precharged with pressurized gas in the pressurized gas chamber. This means that the invention surge regulator valve is fully functional once it is emplaced on a pipe (with the hole piercing being effected).

While the presence of water hammer cannot always be anticipated when planning plumbing layouts, it easily can be corrected by incorporating the piercing shock suppressor valve of the invention at appropriate points in the system, either at individual fixture sites or on lines servicing a number of fixtures. The invention piercing shock suppressor valves allow control and absorption of shock in the pipe lines. The invention device utilizes a sealed-in diaphragm and pre-pressurized, permanent air chamber. When a faucet is open, water flows under pressure in the pipe. Then when the faucet is shut, the sudden closure cause rapid pressure build-up at the faucet. Shock wave begins to form, traveling back along the pipe line. The invention shock regulator accepts and absorbs this shock wave before it becomes an annoying and potentially damaging pipe line hammer.

The invention piercing surge regulator valve is easy to use and is reliable in operation. The invention device can be about the size of a baseball with an arm portion having a length of about the diameter of a baseball.

The invention surge suppressor device prevents water hammer in a sealed piping system. The flexible rubber diaphragm provides a permanent, pre-pressurized air cushion that absorbs excessive water pressure created when a faucet or valve at an appliance is quickly shut off. The invention device serves as a "shock absorber" which quiets nerve-jarring clanging pipes. Water hammer, as the problem is called, results from the abrupt halt or reduction of fast-moving water and can eventually damage plumbing. The invention device can be installed at or near the offending faucet or valve. Then when water surges into the invention device, its flexible diaphragm compresses the sealed air cushion, so the shock force is completely absorbed.

DETAILED DESCRIPTION OF THE INVENTION

Figure 1:
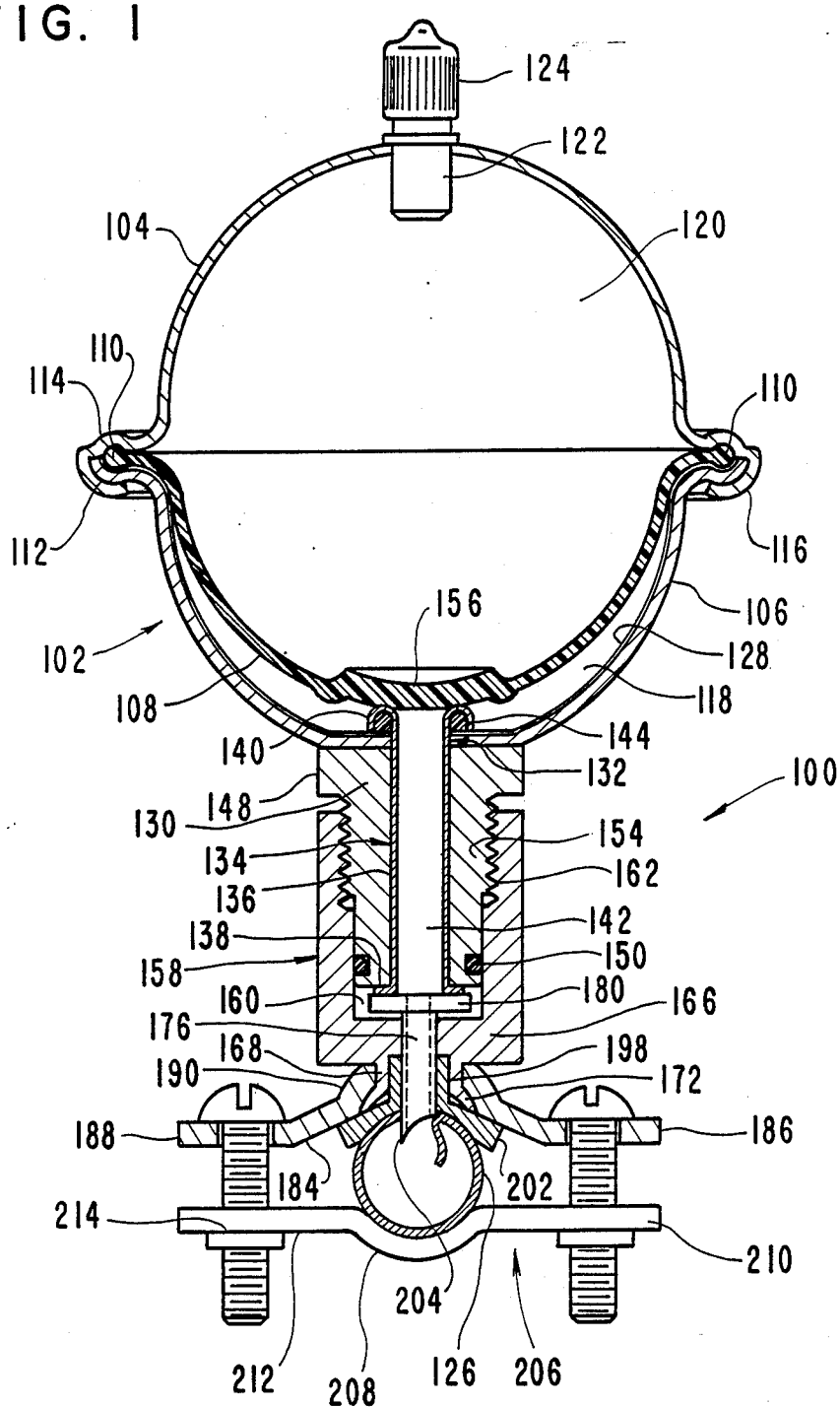
FIG. 1 is a partially cut-away (sectional) side elevational view of the preferred embodiment of the piercing surge regulator valve and apparatus of the invention, mounted on a pipe.

In FIG. 1, surge suppressor or regulator 102 includes upper hemispherical tank portion 104 and lower hemispherical tank portion 106. Upper and lower tank portions 104 and 106 have to withstand internal pressure and pressure shock so they should be constructed of any suitable metal, such as, steel. Flexible diaphragm 108 has a bead or enlarged rim 110 which fits into mating upwardly-curved rim portion 112 of lower tank portion 106 and downwardly-curved rim 114 of upper tank portion 104. Downwardly-curved rim portion 112 usually has an upwardly-facing "C" shape. Downwardly-curved rim portion 114 usually has a downwardly-facing "C" shape. Rim 114 continues with vertical portion 116. After rim 110 of diaphragm 108 and rim 112 of upper tank portion 106 are in place, vertical portion 116 is crimped over top of the outer surface of rim 112 to hold rim 110 of diaphragm 108 in place and to form a water (liquid)- and air (gas)-tight seal to the outside of surge regulator 102 and between lower chamber 118 and upper chamber 120, which are formed by diaphragm 108.

The diaphragm 108 can be made of any sufficiently strong, flexible material which is compatible with the fluid with which it is to be used. In a water system, a butyl rubber is preferred. Examples of other flexible diaphragm material are EPOM (ethylene-propylene dimonomer), which is a rubber composition, flexible plastics, e.g., vinyl or flexible urethane.

Valve core 122 is mounted in a hole in the top of upper tank 104 and has removable valve cap 124. A pressurized gas, usually air, is inserted into upper (or gas) chamber 120 by means of valve core 122. FIG. 1 shows surge regulator 102 in the precharged stated with pressurized air in upper chamber 120 whereby diaphragm 108 is forced downward into lower tank portion 106. Lower tank portion 106 is sometimes terms "air dome". Water from pipe 126 under static pressure conditions (i.e., no flow), can pass into lower chamber 118, so the latter is sometimes termed "water dome".

Typically upper chamber 120 is precharged with air to a pressure of 22 psig. If the water pressure in pipe 126 is 35 psig, the water pressure in lower chamber 118 will also be 35 psig and diaphragm 108 is forced upward until the air pressure in upper chamber 120 is 35 psig (a pressure equilibrium is formed). In other words, when flow occurs in pipe 126 the resulting water pressure drop allows the air chamber (120) pressure to push down on diaphragm 108 until, once again, water and air pressure are equalized at the flow pressure level. Typically this could be 22 psig. When a sudden valve closure occurs in pipe 126, the resulting pressure surge travels backward from the fixture until it reaches surge regulator 102, forcing diaphragm 108 up against/into the air cushion (i.e., air-pressurized upper chamber 120). The shock is absorbed. Typically the surge pressure reaches 75 psig. After absorption of the shock, the system water pressure and the chamber (120) air pressure equalize at the static pressure level (in pipe 126 and lower chamber 118).

Liner 128, usually a plastic, preferably polypropylene, is located on the entire inner surface of lower tank portion 106. Liner 128 protects the inner surface of lower tank portion 106 from corrosion caused by the water in upper chamber 118, thereby preventing contamination of the water in pipe 126. Liner 128 is mechanically locked at bead 110 of diaphragm 108 and at the connector by the roll over of rim 112 thereby compressing bead 110.

The parts in FIGS. 2 to 11 are described by their alignment in FIG. 1, not as aligned in FIGS. 2 to 11.

The bottom region of lower tank portion 106 is flat and contains centrally-located hole 132. The bottom of housing fitting 130 (see FIG. 8) is also flat. Housing fitting 130 has central, vertical bore 134, which is aligned with hole 132. Mounting tube 136 (see FIG. 11) has flat bottom rim 138, top sealing rim 140 and central passageway 142. Mounting tube 136 is preferably composed of brass, but can be any suitable metal which can be rolled over on its ends. As shown in FIG. 1, mounting tube fits tightly in hole 132 of lower tank portion 106 and central bore 134 of housing fitting 130. Usually housing fitting 130 is mounted on loWer tank portion 106 before the latter is assembled with diaphragm 108 and upper tank 104. Mounting tube 130 is inserted into central bore 134 from the top through hole 132 so as to have its upper end (140) projects into lower tank portion 106. At this point in time in assembling surge regulator valve 100, upper end (140) of mounting tube 140 is cylindrical and has the same outside diameter as the main portion of mounting tube 136. Flexible, resilient "O" ring 144 (usually made of flexible resilient rubber or plastic) is inserted over the upper end (140) so as to be flush against liner 128 (of lower tank portion 106). Lower end (140) of mounting tube 136 is crimped outwardly and then back on itself to tightly fit around "O" ring 144. Mounting tube 136 is brazed to the mounting fitting. At this point, surge regulator (container or tank) 102 is usually assembled.

Mounting fitting 130 has external "O" ring groove 146 near its bottom and has top rim 148, which is hexagonal shaped. "O" ring 150, usually made of a flexible rubber or plastic, is located in groove 146. Mounting fitting 130 is externally threaded (154) above rim 148 to a short distance above groove 146.

The central portion (156) of diaphragm 108 is thicker than the rest of diaphragm 108 so as to form a seating portion to seat against upper rim 140 (see FIG. 1). This thickness prevents extrusion through the hole and helps to control the diaphragm motion.

Housing guide 158 (see FIG. 10) is cup-shaped having wide central bore 160 which is internally threaded (162) near its upper end. Bore 164 is located in bottom portion 166 of housing guide 158 and communicates with central bore 160. Cylindrical extension 168 on the bottom has bore 170, which is wider than bore 164 and extends slightly into bottom portion 166. The bottom rim (172) of cylindrical extension 168 is outwardly and downwardly flared (coming to a point) during assembly to upper saddle clamp 182 by means of a staking operation.

Piercing pin 174 (see FIGS. 2 and 3) has piercing tube 176, central bore 178 and top rim 180. Piercing pin 174 sets on the bottom of housing guide 150, as shown in FIG. 1. When assembling, piercing tube 176 is dropped through housing guide 158 into bores 164 and 168, and saddle gasket 202 is pressed on the outer surface of piercing tube 176 and held in place by means of friction.

Upper saddle member 182 (see FIGS. 6 and 7) is elongated in shape, having central C-shaped portion 184 and flat ends 186 and 188. The center of C-shaped portion has cup portion 190 with central bore 192. Central bore 192 fits around cylindrical extension 168 of housing guide 158, as seen in FIG. 1. A hole 194 is located in each of flat ends 186 and 188.

Figure 4:
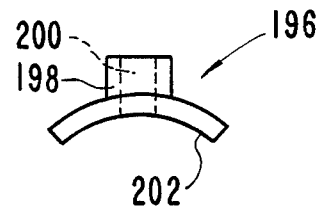
FIG. 4 is a side elevational view of the saddle clamp seal or gasket of the apparatus of FIG. 1.
Figure 6:
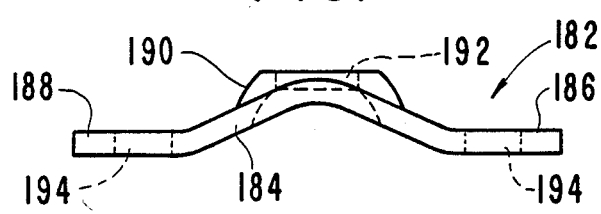
FIG. 6 is a side elevational view of the upper plate of the saddle clamp of the apparatus of FIG. 1.
Figure 5:
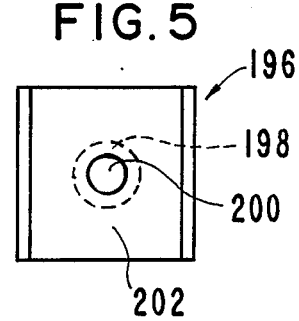
FIG. 5 is a bottom elevational view of the saddle clamp seal or gasket of the apparatus of FIG. 1.
Figure 7:
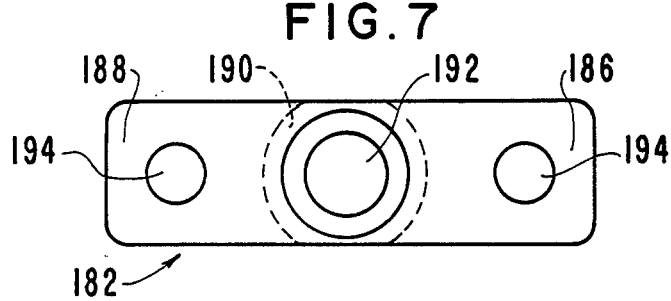
FIG. 7 is a top elevational view of the upper plate of the saddle clamp of the apparatus of FIG. 1.
Figure 8:
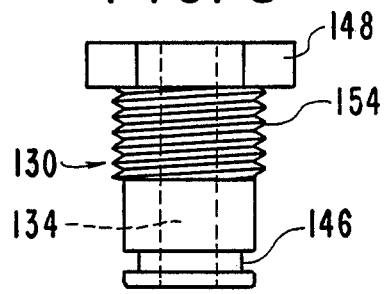
FIG. 8 is a side elevational view of the housing fitting of the apparatus of FIG. 1.
Figure 11:
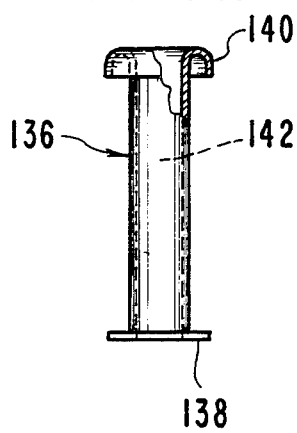
FIG. 11 is a side elevational view of the mounting tube of the apparatus of FIG. 1.
Figure 10:
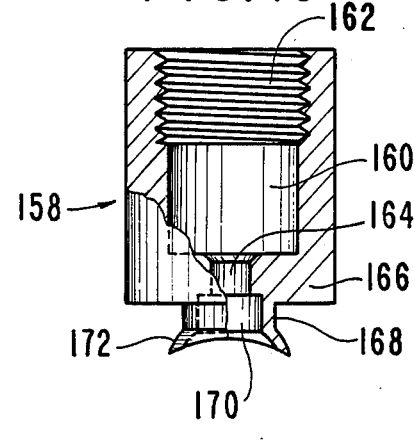
FIG. 10 is a cross-sectional side view of the housing guide of the apparatus of FIG. 1.
Figure 9:
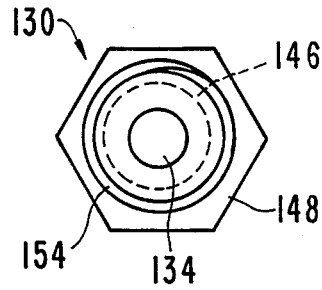
FIG. 9 is a top elevational view of the housing fitting of the apparatus of FIG. 1.

Saddle gasket 196 (see FIGS. 4 and 5) has cylindrical portion 198 with vertical bore 200 therein Bottom portion 202 of saddle gasket 196 is rectangular in shape which has an arcuate surface configuration as seen in FIG. 4. As shown in FIG. 1, cylindrical portion 198 fits in bore 170 (of housing guide 158) around piercing tube 176 (of piercing pin 174). In the non-piercing or non-operating mode, piercing tip or end 204 of piercing pin 174 does not extend out of bore 200.

In the mounting (emplacement) of surge regulator 100 on page 126, top saddle member 182 (having mounted thereon housing guide 158 and saddle gasket 196) is placed against pipe 126. Bottom saddle member 206 has central C-shaped portion 208 and flat arms 210 and 212. A hole (214) is located in each of flat arms 210 and 212. Bottom saddle member 206 is placed on the bottom of pipe 126. Screws 216 and nuts 218 are used to securely affix surge regulator 100 to pipe 126. Saddle gasket 196 is squeezed up against pipe 126 to provide a leak-tight seal therebetween (see FIG. 1). There is no need to braze or solder the saddle clamp to the housing on the pipe. Then the remaining portions of surge regulator 100 are inserted screwed into place.

To provide a hole in pipe 126, housing fitting 130 is screwed further into housing guide 158 whereby piercing tip 204 of piercing pin 174 is advanced to and forced against pipe 126. Thereby, rotational motion is converted into axial motion. A hole is thereby pierced in pipe 126, as seen in FIG. 1. This provides direct communication between pipe 126 and surge regulator 102.

The cut portion of pipe 126 and tip 204 provide minimal disruption of the flow in pipe 126.

Figure 2:
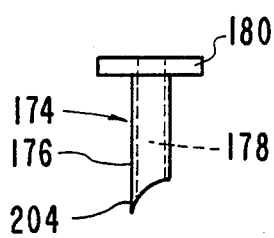
FIG. 2 is a side elevational view of the piercing pin of the apparatus of FIG. 1.
Figure 3:
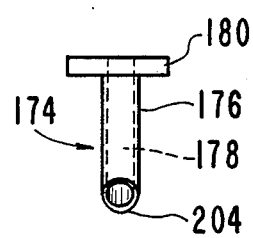
FIG. 3 is a front elevational view of the piercing pin of the apparatus of FIG. 1.

The shape of the piercing end (204) of piercing pin should be an angled one so that the pierced portion of pipe 126 is pushed to one side (hinged in effect) so that metal pieces or fragments are not introduced into pipe 126 (which could cause problems with valves, faucets, appliances, etc.). A slight inward curve or C-shape to the cross-section of the angled piercing end is preferred as such assists in piercing pipe 126 and to bend or push the breached metal to the side. The most preferred shape of piercing end 204 is shown in FIGS. 1 and 2. The cut is smooth and leaves the cut pipe piece to one side so as to leave a relatively unobstructed flow. The angulated piercing end of the piercing pin of Canadian Patent No. 921,735 (the pertinent parts of which are incorporated herein by reference) can be used.

Flange end 180 of piercing tube 174 controls the depth of penetration into pipe 126 by bottoming out on the inner housing 158.

Shock suppressor 102 can be any suitable or conventional shock suppressor modified with the required mating connector. The preferred type of shock suppressor 102 is a prepressurized diaphragm type shock suppressor designed specifically for use with hot water heating systems and supply water systems primarily for domestic use.

Piercing surge regulator valve 100 can be used, for example, on water supply lines for washing machines, dishwashers, ice makers, sinks and showers. More specifically, piercing surge regulator valve 100 can be installed on supply risers connected to lavatories and sinks, on supply lines to flush valves serving water closets and urinals, and on hot and cold water lines just before hose connector shut-off valves connected to washing machines and dishwashers.

In plumbing systems that utilize water-use appliances and faucets, the sound of banging pipe lines is a common occurrence. The widely used single lever and push-pull-type faucets, and solenoid valves in ice makers, dishwashers and washing machines are extremely quick closing. The sudden cutoff of water flow causes an immediate build-up of pressure, producing a high pressure wave that travels quickly back along the pipe line, creating intense vibration and banging. This so-called "water hammer" is not only annoying but can cause ruptured lines, leaks at joints and connections, and damage to pumps and fixtures.

Piercing surge regulator 100 is best mounted on top of the pipe and most preferably on the vertical.

Figure 12:
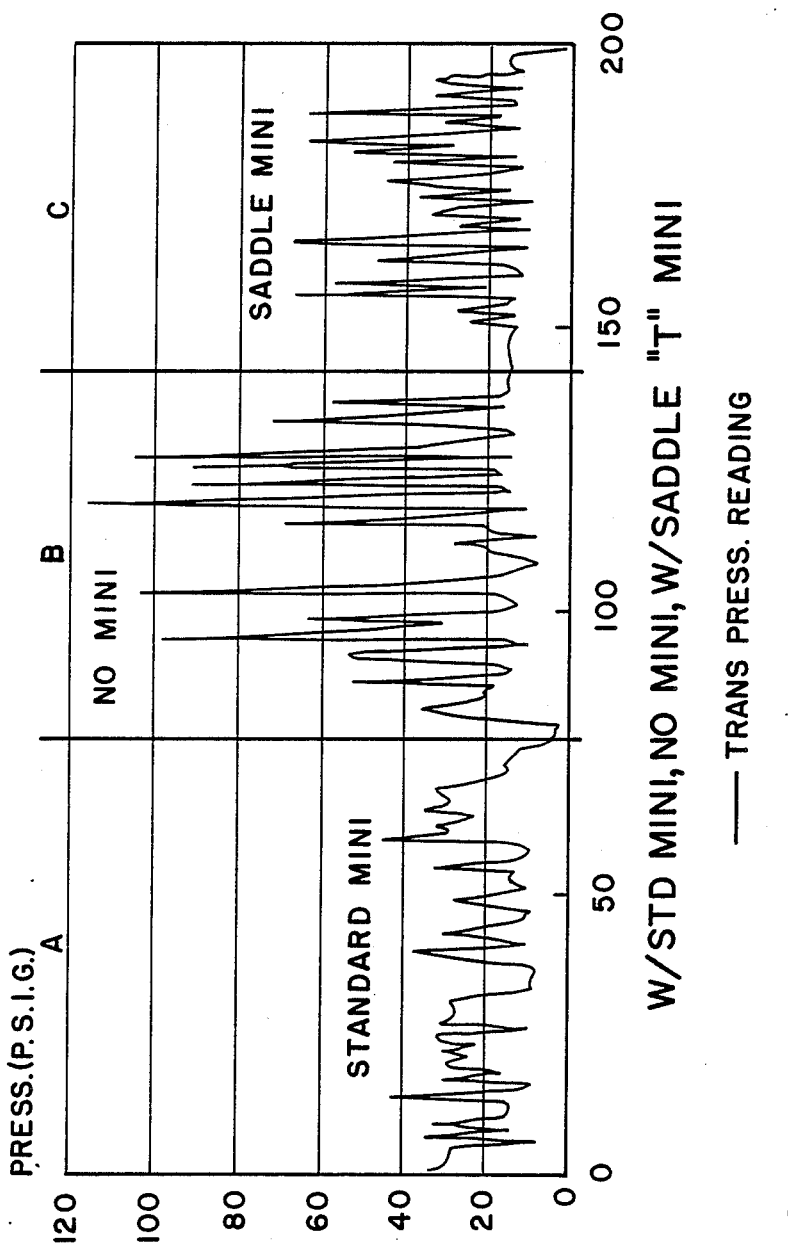
FIG. 12 is a graph of shock loops for the invention device and a prior art device.

FIG. 12 is a graph showing comparative shock loop results for closing a valve in a water pipe which was flowing at 7 gallons per minute at 6 psig with 50 feet of ½ inch Type "L" tubing. (In the tests represented in FIG. 12, the same diameter pipe was used for all three tests; pressure was measured using transducers.) Section A of the graph is the shock loop from closing the line in which a MINITROL ® shock regulator has been permanently inserted (using a T-fitting) in a pipe. A MINITROL ® shock regulator is marketed by Amtrol Inc. and is a prepressurized diaphragm type shock suppressor designed specifically for use with hot water heating systems. The MINITROL ® shock regulator was precharged with air to 22 psig. The pressure peaks of the shock loop (when the valve was shut) for when the MINITROL ® shock regulator was used were far less than when no MINITROL ® shock regulator was used (see Section B). Section C of the graph is the shock loop from closing the line in which piercing surge regulator valve 100 of the invention was installed (emplaced) on a pipe. The internal diameter of the tube of piercing tube 174 was 0.125 inch (I.D. of the tubing was about ⅜ through ¾ inch normal sizes). Smaller internal tube sizes do not provide as satisfying shock control as does the 0.125 inch I.D. hole for the tubing or pipe. Larger internal tube sizes can be used, depending upon the pipe size. The pressure peaks for when the invention piercing surge regulator valve 100 was used were on average higher than the average of the pressure peaks for when the MINITROL ® surge regulator was used but was much lower than the average of the pressure peaks when no surge regulator was used. The invention device provides satisfactory protection of pipes, joints, etc., against "water hammer" while providing ease and simplicity of installation for the user.

The invention shock regulator is usually mounted so that the pressurized-air chamber is above the pipe.

The invention device eliminates the problem of pipes banging or hammering when the water is turned on or off. This often happens with washing machines whose electrically operated valves shut the water off quickly at the end of a filling cycle. The invention device can be easily installed in the water line leading to the faucet or appliance that causes the problem. It has a rubber diaphragm on the inside that permanently encloses a sealed air chamber. When a surge of pressure occurs inside of the pipe, after a valve or faucet has been quickly closed, the extra energy is absorbed by this air chamber. Because this air is sealed off from the water, it is never absorbed and thus the unit does not have to be opened and "bled" or recharged with air periodically. The invention device is easily installed in a hot or cold water line.

The foregoing describes preferred and other embodiments of the invention, and it will be understood that these embodiments are intended to illustrate and not to limit the invention, except as limitations are delineated in the appended claims.

What is claimed is:

1. A piercing surge regulator valve for use with a liquid-carrying member, comprising:
   (a) a valve body adapted to be connected to the liquid-carrying member in a sealing manner, said valve body comprising a housing and a housing fitting inside of the housing, the housing and housing fitting being movable in relation to each other;
   (b) a bore in the valve body;
   (c) a container containing a flexible diaphragm therein so as to divide the container into two chambers, one chamber adapted to contain pressurized gas and the other chamber adapted to contain pressurized liquid, the container having a hole whereby the pressurized-liquid chamber communicates with the bore; and
   (d) a piercing element movable within the bore and having a passage therethrough, the housing fitting engaging the piercing element, movement of the housing fitting inwardly in relation to the housing causing the piercing element to move in a direction toward the liquid-carrying member for piercing a hole in the liquid-carrying member so as to allow liquid pressure to flow through the piercing element into the pressurized liquid chamber to suppress any shock wave or liquid hammering as a result of excessive liquid pressure created when the liquid-carrying member is shut-off.

2. A piercing surge regulator valve as claimed in claim 1 wherein the liquid-carrying member is a tube or pipe.

3. A piercing surge regulator valve as claimed in claim 1 wherein the liquid-carrying member is a plastic pipe or copper tube.

* * * * *